June 19, 1934.  L. A. JOHNSON  1,963,849
OIL RETAINER
Filed July 25, 1932
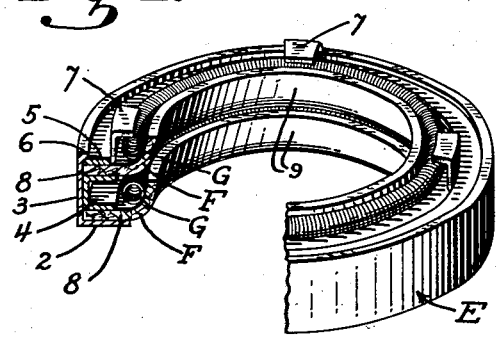
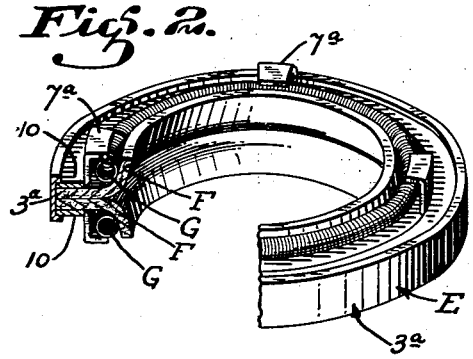
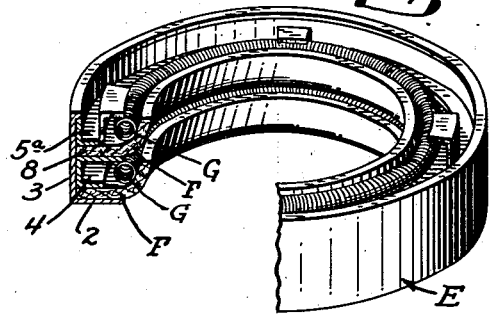
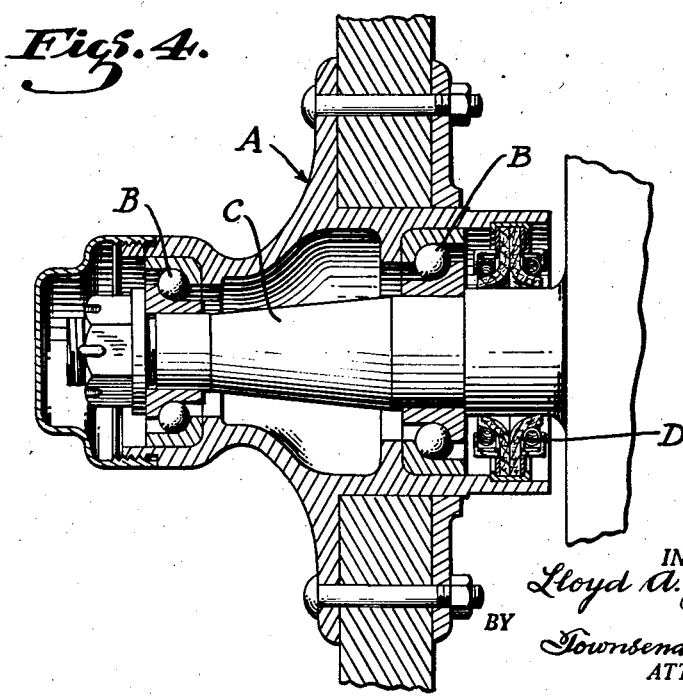
INVENTOR.
Lloyd A. Johnson.
BY Townsend & Loftus.
ATTORNEYS.

Patented June 19, 1934

1,963,849

UNITED STATES PATENT OFFICE 1,963,849

OIL RETAINER

Lloyd A. Johnson, Hillsborough, Calif.

Application July 25, 1932, Serial No. 624,537

1 Claim. (Cl. 288—1)

This invention relates to packing devices commonly known as oil or grease retainers, and especially that type in which the packing member is carried by a ring-shaped metal cage and the cage, together with the packing, is insertable as a unit within the housing of a bearing or the like.

Oil or grease retainers of this character are extensively used in the automotive industry and in many instances where it is necessary to prevent escape of the lubricant from the bearings, and also in instances where it is essential to exclude entrance of dust or other foreign matter into the bearings.

There are also instances where bearings operate under fairly high temperatures, where the lubricant is maintained under fairly high pressure, and under such conditions it is more or less common practice to employ two or more oil retainers in the bearing to form a double seal or packing as leakage of the lubricant may otherwise occur due to thinning of the lubricant or the pressure employed.

Where two or more oil retaining units are employed, the space required is materially increased and cost is doubled or trebled depending upon the number of oil retainers employed.

The object of the present invention is to generally improve and simplify the construction and operation of oil retainers of the character described; to combine in a single unit a plurality of packing or lubricant retainers; and further, to provide a retainer of this character which is compact in construction so as to occupy a minimum of space within the bearing.

The oil retainer is shown by way of illustration in the accompanying drawing, in which—

Fig. 1 is a perspective view partially broken away and partially in section showing one form of the grease or oil retainer employing a multiple packing.

Fig. 2 is a similar view showing another form of multiple packing.

Fig. 3 is a similar view showing a modified form of that illustrated in Fig. 1.

Fig. 4 is a longitudinal sectional view of an automobile front wheel assemble showing the application of the oil or grease retainer shown in Fig. 2.

Referring to the drawing in detail, and particularly Fig. 4, A indicates the hub or bearing housing of an automobile front wheel, B antifriction bearings mounted within the housing, C the shaft or spindle upon which the hub and wheel is journaled, and D the grease or oil retainer employed for the purpose of preventing escape of lubricant from the bearing into the brake drum or adjacent mechanism.

The grease retainer shown in Fig. 1 comprises an exterior cage member E, a pair of packing members F, and G indicates a pair of cooperating contractile springs. The cage E is formed by punch and die operations from a suitable metal, such as sheet steel or the like. The cage, when first formed, is angle-shaped in cross section to form an annular base or supporting flange 2 and a peripheral wall section 3. The innermost packing member F is supported by the flange 2 and the outermost packing member is supported by a combination reinforcing and spacing member generally indicated at 4. This may also be made of metal and is channel-shaped in cross section, as shown. On top of the outermost packing member is placed a clamping ring 5 and this is secured by a turned over flange 6 formed in any suitable manner from the peripheral wall section 3 of the cage. The clamping ring 5 serves two functions; first, that of clamping the packing member within the cage, and secondly, that of a retainer for the outermost contractile spring G; the second function being accomplished by providing a plurality of projecting lugs, such as indicated at 7, which overlie the spring and thus retain it from removal, the innermost contractile spring F being secured against removal by the overlying packing member.

The packing members employed will in most instances be constructed of leather but may be constructed of any other pliable material. Each packing member is provided with an annular flange portion 8 and an axially extending annular portion 9 which surrounds the shaft or spindle C, the axially extending portions of the packing members being held in sealing or packing engagement with the spindle by means of the surrounding contractile springs G.

The contractile springs employed are preferably endless helically coiled ring-shaped springs. These springs are expanded when applied and as such exert sufficient exterior pressure on the axially extending portions of the packing members to maintain sealed engagement with the shaft or spindle. In actual manufacture, when the cage is formed, the innermost packing member is pressed within the cage and is supported by the annular flange 2. The combination reinforcing and spacing member is then placed on top thereof and the contractile spring is expanded and placed in position, the second packing member is then placed on top of the spacing member and the second contractile spring and the clamping ring is then pressed in position on top thereof, after which the annular flange 6 is turned over in any suitable manner; sufficient pressure being applied to the clamping ring 5 when the flange 6 is turned over to insure sealed engagement between the annular flanges 2, the packing members and the cage so that no leakage can occur around the same.

The packing members inserted and secured in the cage, as described, may be inserted in bearings of different character. In Fig. 4, it is shown as inserted in the hub or bearing housing of an automobile front wheel. In such instances the cage is either pressed or driven into the end of the hub or housing A and a sealed engagement is thus maintained between the outer peripheral wall 5 of the cage and the housing so as to prevent leakage around the same. The axially extending portions of the packing members are maintained in sealed or tight engagement with the spindle C and leakage of lubricant, whether it be grease or oil, is prevented.

In Fig. 3 a slight modification of the structure shown in Fig. 1 is illustrated. The same packing members are employed, the same cage E, and the same spacing and clamping members, the only difference being that the cage is slightly wider and that the clamping ring, indicated at 5a, is angle-shaped so as to also function as a reinforcing member; that is, where oil retainers of this character are driven or pressed into the end of a bearing housing there is danger of collapsing or squashing the cage out of shape. This is, however, prevented in the present instance by the additional metal provided by the spacing and clamping rings. This metal reinforces the outer peripheral wall of the cage and danger of collapse or damage to the cage is prevented.

In Fig. 2, another modified form is shown. In this instance, the packing members are placed back to back; that is, the axially extending portions of the packing members point in opposite directions. The peripheral wall of the cage may in that instance be made quite narrow. Two clamping rings will be employed, as shown at 10—10, and both will be provided with lugs 7a to function as retainers of the contractile springs.

Also, it should be noted that both edges of the metal cage, indicated at 3a, are turned over to secure the clamping rings in place.

The type of packing unit shown in Figs. 1 and 3 is preferably employed where a bearing is subjected to fairly high temperatures, or where the lubricant is maintained under pressure. In such installations a double seal or packing is provided and leakage is prevented. In instances where it is desired to prevent leakage and at the same time prevent entrance of dust or other foreign matter, the type of packing shown in Fig. 2 is employed, as the outermost packing member prevents entrance of foreign matter while the innermost packing member forms a seal to prevent the escape of the lubricant.

In the several structures disclosed it will be noted that compact and rigid construction is obtained. A minimum of space is thus required within the bearing housing; cost and installation charges are reduced, and more satisfactory results are obtained.

While certain features of the present invention are more or less specifically described, I wish it understood that various changes may be resorted to within the scope of the appended claim. Similarly, that the materials and finish of the several parts employed may be such as the manufacturer may decide, or varying conditions or uses may demand.

Having thus described my invention, what I claim and desire to secure by Letters Patent is—

A lubricant retainer comprising a plurality of pliable packing members, each having an annular flange and an axially extending portion, said packing members being placed back to back so that the axially extending portions will extend in opposite directions, a pair of clamping rings engageable with the annular flanges of the packing members, a cage enclosing and securing the annular flanges of the packing members and the clamping rings, a pair of contractile springs, one for each axially extending portion of the packing members and surrounding the same, and a plurality of lugs carried by each clamping ring and engageable with the contractile springs to secure them against displacement.

LLOYD A. JOHNSON.